(12) United States Patent
Ohnishi et al.

(10) Patent No.: US 8,081,550 B2
(45) Date of Patent: Dec. 20, 2011

(54) OPTICAL PICKUP DEVICE

(75) Inventors: Kunikazu Ohnishi, Yokosuka (JP); Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 131 days.

(21) Appl. No.: 12/608,121

(22) Filed: Oct. 29, 2009

(65) Prior Publication Data

US 2010/0226229 A1 Sep. 9, 2010

(30) Foreign Application Priority Data

Mar. 9, 2009 (JP) ................................ 2009-054377

(51) Int. Cl.
*G11B 7/00* (2006.01)
*G11B 20/18* (2006.01)
(52) U.S. Cl. ................ 369/53.23; 369/44.23; 369/44.41
(58) Field of Classification Search .................... None
See application file for complete search history.

(56) References Cited

U.S. PATENT DOCUMENTS

| | | | | |
|---|---|---|---|---|
| 6,339,562 | B1 * | 1/2002 | Sakai | 369/44.23 |
| 2009/0257340 | A1 * | 10/2009 | Nagata et al. | 369/121 |

FOREIGN PATENT DOCUMENTS

| | | |
|---|---|---|
| JP | 09-161282 | 6/1997 |
| JP | 2006-286077 | 10/2006 |
| JP | 2007-004982 | 1/2007 |
| JP | 2007-102928 | 4/2007 |
| JP | 2007-287232 | 11/2007 |
| JP | 2007-335047 | 12/2007 |
| WO | WO 2006/067674 | 6/2006 |
| WO | WO 2007/043663 | * 4/2007 |

* cited by examiner

*Primary Examiner* — Christopher R Lamb
(74) *Attorney, Agent, or Firm* — Antonelli, Terry, Stout & Kraus, LLP.

(57) ABSTRACT

In a multilayer disc has an increased number of recording layers) spaced by spacing from each other, a generation interval between focus error (FE) signals detected from the respective recording layers becomes small. This causes mutual interference between the FE signals and a resulting undesired offset and the like in the signals, leading to a significantly deteriorated quality of the FE signals. To avoid this, in an optical pickup device according to the present invention, detection surfaces are newly added at positions adjacent to the FE signal detection surfaces, a predetermined detection signal obtained from the newly-added detection surfaces is multiplied by a predetermined coefficient value depending on the spacing between the recording layers, and the multiplied signal is subtracted from the original FE signal. As a result, mutual interference between the FE signals can be remarkably reduced.

6 Claims, 11 Drawing Sheets

OPTICAL PICKUP DEVICE

INCORPORATION BY REFERENCE

The present application claims priority from Japanese application JP 2009-54377 filed on Mar. 9, 2009, the content of which is hereby incorporated by reference into this application.

BACKGROUND OF THE INVENTION

The present invention relates to an optical pickup device which has a function of reproducing an information signal or recording an information signal in the multilayer optical disc, in particular, from a multilayer optical disc having a plurality of recording layers within a single disc.

One of background arts is disclosed, for example, in JP-A-9-161282 which discloses an FE (focus error) signal detecting technique which is applied to multilayer optical discs.

SUMMARY OF THE INVENTION

As means for increasing the recording capacity of a single optical disc, a technique for increasing the number of recording layers in the single disc is rapidly being put to practical use in these years. In the technique for attaining an increased number of recording layers in a single optical disc, since a plurality of information-signal recording layers are laminated to be spaced from each other by a constant spacing or by different interlayer spacings within the same optical disc, the recording capacity of the disc can be increased to twice or more of the recording capacity of a conventional optical disc having a single recording layer.

When it is desired to reproduce an information signal from each of the information-signal recording layers provided in such a multilayer optical disc or to record an information signal into the information-signal recording layer, so-called focus control is required in order to focus a recording laser beam on a target recording layer, as in the case of the conventional optical disc having a single recording layer. For the purpose of executing this focus control, it is essential to detect a focus error signal (referred to as an FE signal, for simplicity, hereinafter) as a matter of course.

When such an ordinary FE-signal detecting means as to be used in the conventional single-layer optical disc is employed for a highly-multilayered optical disc especially having three or more recording layers laminated therein and spaced by an interlayer spacing as relatively small as approximately several μm, this involves a problem that a plurality of FE signals detected from the respective recording layers interfere with each other and a mutual interference causes, and this major cause generates undesired offset components or waveform distortion in the FE signals, resulting in a highly deteriorated signal quality. To avoid this, a new FE signal detecting means capable of preventing the aforementioned mutual interference between the FE signals and avoiding the offset or waveform distortion involved thereby is indispensable for such a multilayer optical disc.

Such a known conventional technique as disclosed in JP-A-9-161282 as a typical technique is insufficient in practical performance when employed, in particular, for the aforementioned highly-multilayered optical disc having an increased number of recording layers, from the viewpoint of enabling optimum detection of the FE signals while even taking account of disc discrimination (to be explained later) or calculation of the interlayer spacing.

From the viewpoint of the above circumstances, it is an object of the present invention to provide a novel technique for solving the erroneous detection of FE signals from such a highly-multilayered optical disc as mentioned above and detecting high quality FE signals, and also to provide an optical pickup device compatible with the multilayer optical disc to which this technique is applied.

The above object can be attained, as an example, by using such devices as disclosed in the claims.

In accordance with the present invention, there is provided an optical pickup device which can detect high quality FE signals from the multilayer optical disc with high reliably, which will be explained later.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

Embodiment 1

Figure 1:
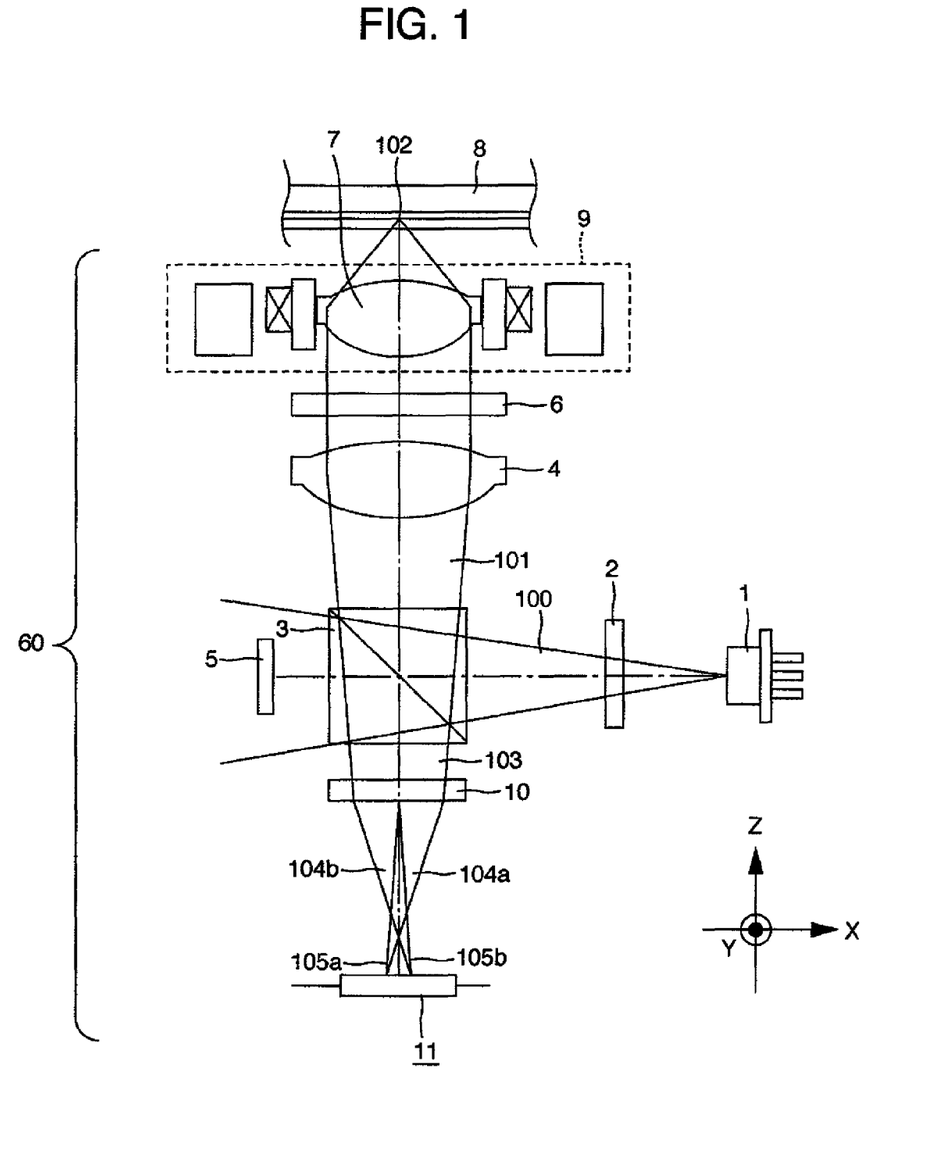
FIG. 1 is a schematic front view of an optical pickup device in accordance with a first embodiment of the present invention.
Figure 2:
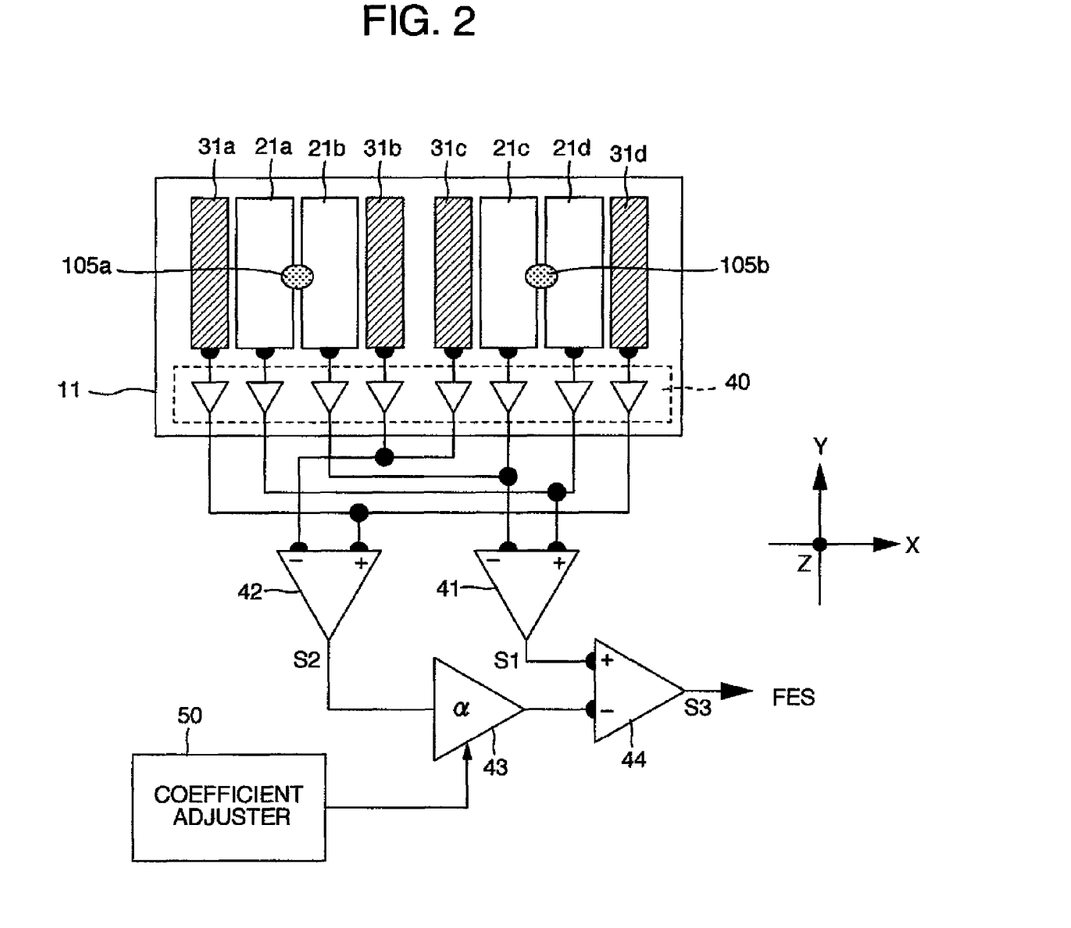
FIG. 2 is a schematic plan view of an optical detector as a major part of the first embodiment of the present invention.

FIGS. 1 and 2 represent an optical pickup device in accordance with a first embodiment of the present invention. FIG. 1 is a schematic plan view of an example of the arrangement of an optical system in an optical pickup device 60 of a type of detecting FE signals, generally called as a double knife edge method or Foucault method. FIG. 2 is a schematic view of an example of an optical detector 11 and a signal calculating circuit mounted on the optical pickup device 60 of FIG. 1.

In FIG. 1, reference numeral 1 denotes a semiconductor laser light source which emits a laser beam having a predetermined wavelength, for example, a 405 nm wavelength band.

The light beam emitted from a semiconductor laser light source 1 reaches a wavelength plate 2. The wavelength plate 2 is arranged to arbitrarily control the polarization direction of a light beam 100 passed through the wavelength plate 2 and then directed into a polarization beam splitter 3 (abbreviated merely to PBS for simplicity, hereinafter) in order to separate it into a light beam 101 having an S polarization component which is reflected by a reflecting surface within the PBS 3 and reaching a collimating lens 4 and a light beam having a P polarization component which passed through the reflecting surface and then directed to an optical detector 5 (referred to as a front monitor for simplicity, hereinafter) for light quantity monitoring.

The light beam 101 reflected by the PBS 3 is converted by the collimating lens 4 from the diffused light beam to a nearly parallel or collimated light beam, converted to a circularly polarized beam after passed through a ¼ wavelength plate 6, and then directed into an objective lens 7. The objective lens 7 has a function of focusing the incident laser light flux and irradiating a focused light spot 102 on one predetermined single recording layer within a multilayer optical disc 8 having a plurality of signal recording layers.

The objective lens 7 is held on an actuator 9. The actuator 9 is arranged so that the actuator 9, when receiving a predetermined objective-lens position-control signal, controls the position of the objective lens 7 in radius and optical axis directions of the multilayer optical disc 8. Further, the intensity of the focused light spot 102 irradiated onto the predetermined signal recording layer within the optical disc 8 is controlled on the basis of a light quantity signal detected by the front monitor 5.

A light beam reflected on the predetermined signal recording layer within the optical disc 8 proceeds along nearly the same optical path as the incoming light beam but in a direction opposite thereto, converted through the objective lens 7 and the ¼ wavelength plate 6 to a light beam whose polarization direction (P polarization) is perpendicular to the polarization direction (S polarization), converted by the collimating lens 4 from the collimated light beam to a converged light beam, and again reaches the PBS 3. Different from the incoming route, the outgoing light beam, this time, passes through the PBS 3 at a transmission coefficient of approximately 100%.

A light beam 103 passed through the PBS 3 is directed into a two-division diffraction grating 10. The two-division diffraction grating 10 has a function of dividing the incident light beam nearly equally into two beams which are diffracted in mutually different directions. For this reason, light beams 104a and 104b having nearly semi-circular sectional shapes divided by the two-division diffraction grating 10 proceed in the mutually different directions and irradiated onto a predetermined beam receiving surface within the optical detector 11 as light spots 105a and 105b, respectively.

Explanation will then be briefly made as to an arrangement of the beam receiving surface of the optical detector 11 and to the signal calculating circuit. As shown in FIG. 2, the optical detector 11 has totally eight beam receiving surfaces 21a to 21d and 31a to 31d on a same plane. The light spots 105a and 105b are formed on a boundary between adjacent beam receiving surfaces 21a and 21b and on a boundary between the beam receiving surfaces 21c and 21d, respectively Photoelectric converted signals output from the respective beam receiving surfaces 21a to 21d are passed through a current/voltage converter 40 and a subtractor 41 and then are output therefrom as an output signal S1. If detection signals obtained from the beam receiving surfaces 21a to 21d through the current/voltage converter 40 are denoted by V1a, V1b, V1c and V1d, the output signal S1 is expressed by an equation which follows.

$$S1=(V1a+V1d)-(V1b+V1c) \qquad (1)$$

That is, the output signal S1 is the same as the FE signal detected according to the known conventional detection method called the double knife edge method or the Foucault method. How to detect an FE signal according to the double knife edge method or the Foucault method is an already known technique and thus detailed explanation thereof is omitted.

When a single layer optical disc having only one recording layer or a multilayer optical disc having recording layers spaced from each other by a sufficiently large spacing therebetween employs such a conventional detection method as shown by the above equation (1), it is possible to well detect the FE signal without any trouble. However, when a multilayer disc having an increased number of recording layers spaced from each other by a spacing as small as several µm employs the conventional detection method, it is impossible to well detect the FE signal. Explanation will be made in detail as to problems in detecting the FE signal in the highly-multilayered disc by referring to its specific example.

Figure 3:
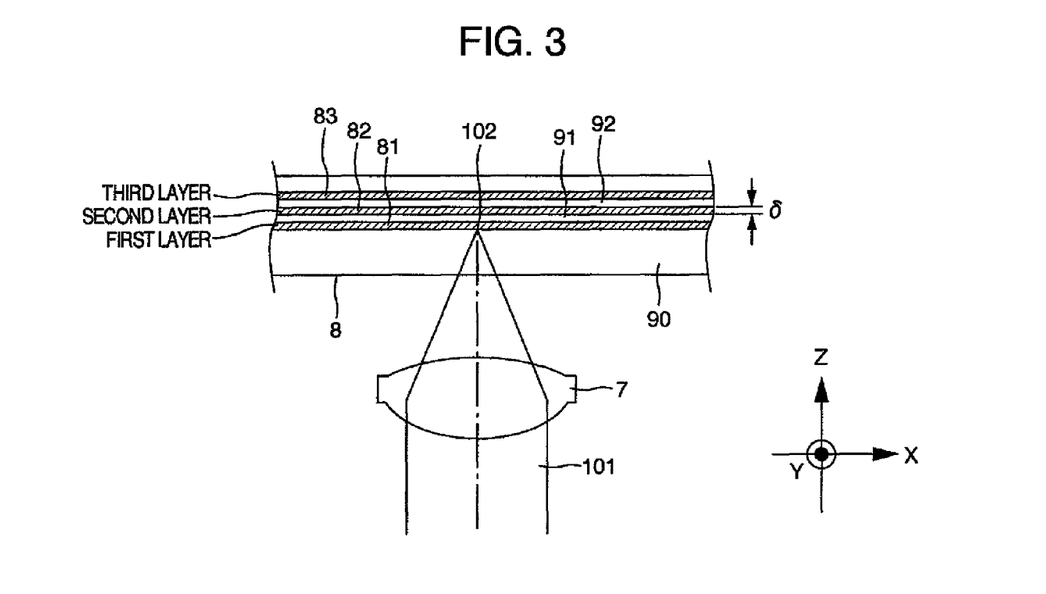
FIG. 3 is a schematic cross-sectional view of an arrangement of a multilayer optical disc.

Explanation will is schematically made first as to the arrangement of recording layers in a multilayer disc. FIG. 3 is a schematic cross-sectional view of three recording layers in the optical disc 8. As illustrated, the optical disc 8 is arranged so that a plurality of recording layers 81, 82, 83 are laminated on a transparent substrate 90 with transparent intermediate layers 91 and 92 interposed therebetween. That is, a space between the adjacent recording layers, corresponding to an intermediate layer, is separated by a predetermined spacing b in its optical axis direction (Z-axis direction in the drawing). Although FIG. 3 represents an example of a multilayer disc having three recording layers, the number of recording layers in the multilayer disc is not limited to three but may be two or a number higher than three as a matter of course. Although, in this specification, we called the recording layers, first, second and third recording layers sequentially from the recording layer next to the transparent substrate 90 for simplicity, the naming is not restricted to such naming rule in an actual disc as a matter of course.

When it is desired to reproduce an information signal from a specific recording layer in such optical disc 8 or conversely to record the information signal to a recording layer, it is necessary to search for a target recording layer first by driving the objective lens vertically. At this time, the vertical driving of the objective lens causes the focused light spot 102 to sequentially pass through the respective recording layers, and an FE signal is detected at each time when the spot passes through each recording layer.

By counting the FE signals for the respective recording layers, the number of all recording layers in the target disc can be calculated and the spacing between the recording layers can be calculated on the basis of the appearance interval of the FE signals. Further, the position of the target recording layer can be searched for and determined with use of these calculation results. After the target recording layer is determined, focus control is executed in order to irradiate the focused spot on the target recording layer correctly and stably, as a matter of course. The above FE signal is also used even as a control signal for the focus control.

In other words, the FE signal is an extremely important signal which is used not only as the focus control signal but also to discriminate the optical disc or to search for the position of the target recording layer. The quality of the FE signal largely depends on the overall performance of the optical pickup device. As has been mentioned above, however, the detection of the FE signals based on the conventional double knife edge or the Foucault method results in that a signal quality is significantly deteriorated, in particular, in a highly-multilayered optical disc.

Figure 4:
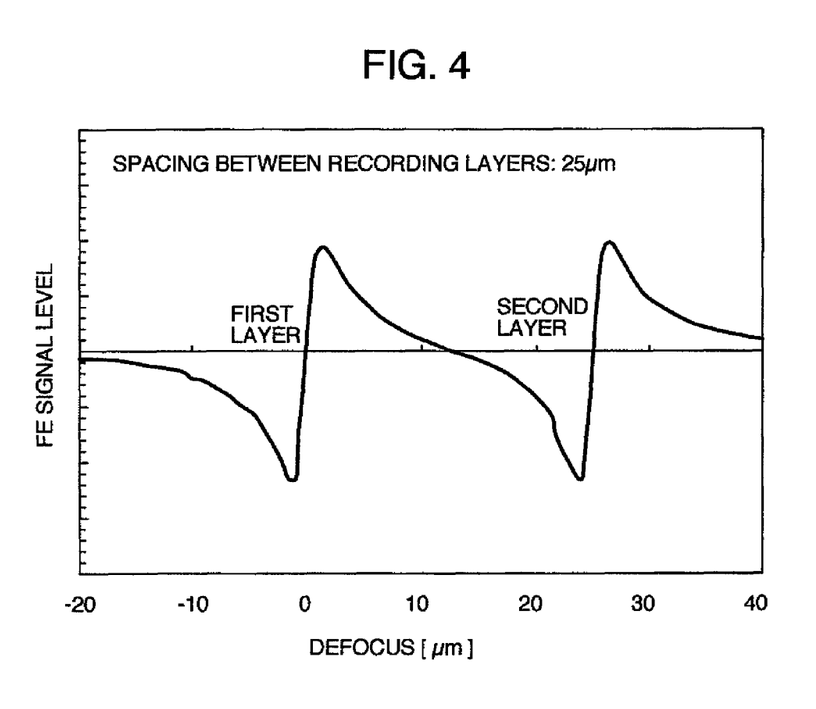
FIG. 4 is an example of a waveform of FE signals for a two-layer disc of a conventional type.

FIG. 4 represents an example of a waveform of FE signals detected according to the conventional double knife edge method in a two-layer disc having recording layers spaced by a spacing $\delta=25$ μm. The graph has an origin at which the focused light spot 102 on the optical disc is located on the first recording layer, an abscissa indicative of a defocus from the origin, i.e., a displacement of the focused light spot 102 in the optical axis direction, and an ordinate indicative of the level of the FE signals. In the case of FIG. 4, since the spacing between the recording layers is relatively large, the appearance interval of the FE signals detected at each time when the focused light spot 102 passes through the respective recording layers is also sufficiently large. For this reason, substantially no mutual interference takes place between the FE signals, which results in that the respective FE signals are kept to have good waveforms similarly to the case of the conventional single-layer disc.

Figure 5:
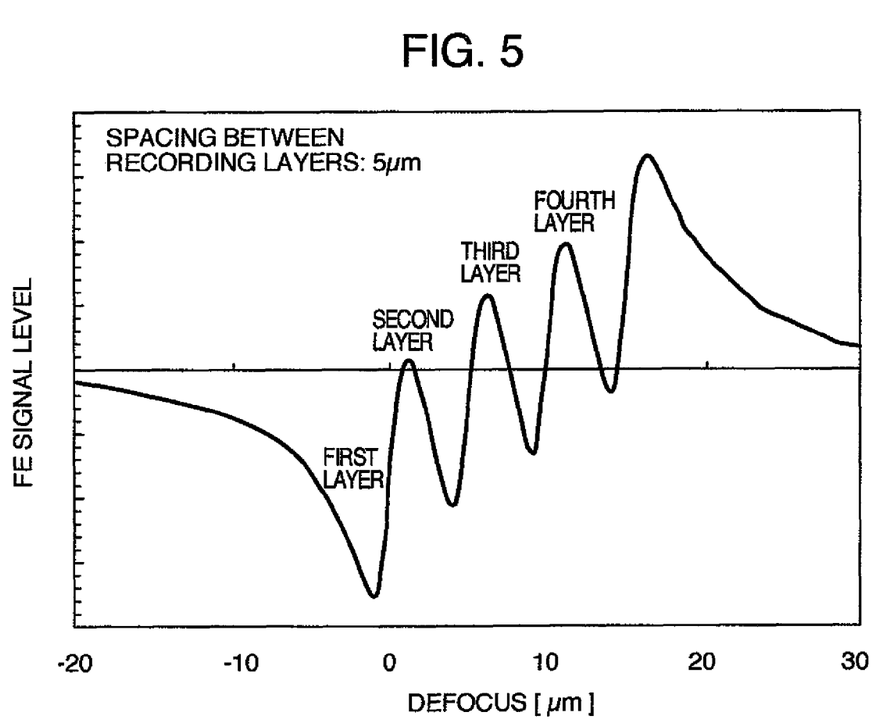
FIG. 5 is an example of a waveform of FE signals for a four-layer disc of a conventional type.

FIG. 5 represents an example of a waveform of FE signals detected for a four-layer disc having recording layers spaced by a spacing $\delta=5$ μm according to the conventional double knife edge method exactly in the same manner as in the case of FIG. 4. In the drawing, abscissa and ordinate are defined in exactly the same way as in FIG. 4. As will be clear from the drawing, large offsets take place in the FE signals detected at each time when the spot passes through the respective recording layers and the offsets are increased or decreased for the respective recording layers. Since the spacing $\delta$ is 5 μm which is much smaller than that in the example of FIG. 4, such undesirable offsets are caused by great mutual interference between the FE signals, that is, by such a phenomenon that the skirt parts of the FE signal of a certain recording layer are overlapped with the FE signals of the recording layers adjacent thereto. In this way, large offsets take place in the FE signals and are not constant in quantity and increased or decreased depending on different recording layers. This, as a matter of course, leads to not only to undesirable focus control but also erroneous disc discrimination or erroneous searching for the target recording layer prior to the focus control. That is, in the case of a highly-multilayered having recording layers spaced by a relatively small spacing, such a serious defect takes place that the detection of the FE signals according to the conventional double knife edge or the Foucault method results not only in that good focus control becomes impossible but also in that even disc discrimination or searching for the target recording layer goes wrong.

For the purpose of solving the problem with such erroneous detection of FE signals in the highly-multilayered disc, the present invention discloses a novel FE detection method, which will be explained below.

In an optical pickup device according to the present invention as illustrated, for example, in FIG. 2, the four beam receiving surfaces 31a to 31d are newly provided to detect the signal 51 at positions on the same plane on which the beam receiving surfaces 21a to 21d are located and adjacent to the beam receiving surfaces 21a to 21d.

Figure 6:
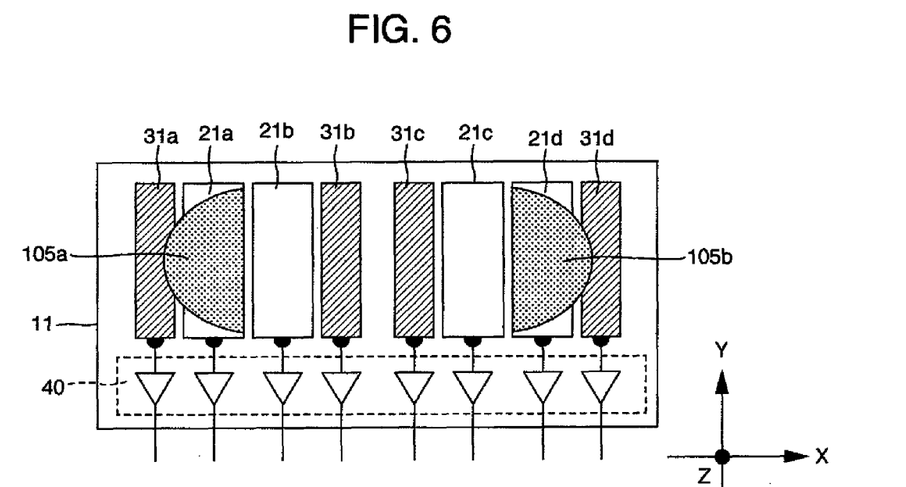
FIG. 6 is an example of a positional relationship between a beam receiving surface and an optical spot in the first embodiment.
Figure 7:
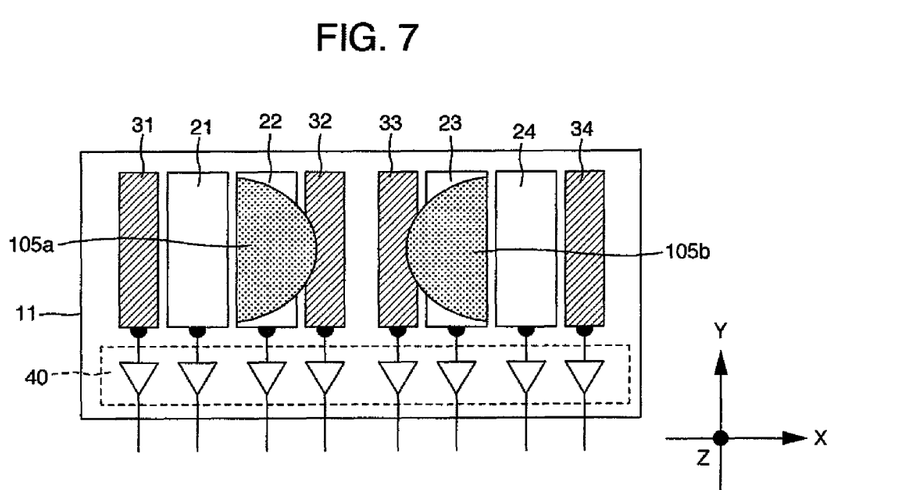
FIG. 7 is another example of a positional relationship between a beam receiving surface and an optical spot in the first embodiment.

In the optical pickup device for detecting the FE signals according to the double knife edge or the Foucault method as in the present embodiment, the focused light spots 105a and 105b are irradiated on the boundary between the beam receiving surfaces 21a and 21b and the beam receiving surfaces 21c and 21d in such a manner that the spots are converged nearly to a diffraction limit in a just focus mode (having a defocus of 0 μm). As the spot is defocused, the spot gradually blurs and the size of the semicircular spot image gradually increases. When the size of the spot image exceeds a constant level, the spot image is partly spread even to the beam receiving surfaces 31a to 31d as illustrated in FIG. 6 or 7. Under such a condition, a predetermined photoelectric conversion signal is output even from the beam receiving surfaces 31a to 31d.

When these new photoelectric conversion signals are passed through the current/voltage converter 40 and a subtractor 42 to be subjected to predetermined calculating operation, the subtractor 42 outputs a signal S2. The output signal S2 is expressed by an equation (2) which follows, where V2a, V2b, V2c and V2d denote detection signals output from the beam receiving surfaces 31a to 31d, respectively, and passed through the current/voltage converter 40.

$$S2=(V2a+V2d)-(V2b+V2c) \quad (2)$$

Then the output signal S2 thus detected is multiplied by a predetermined coefficient value $\alpha$ through an amplifier/attenuator 43 and sent to a subtractor 44. The subtractor 44 subtracts the output signal S2 from the original signal S1 to generate a signal S3, which is expressed by an equation (3) as follows.

$$S3=S1-\alpha \times S2 \quad (3)$$

The signal S3 thus obtained is used as a new FE signal (FES).

Figure 8:
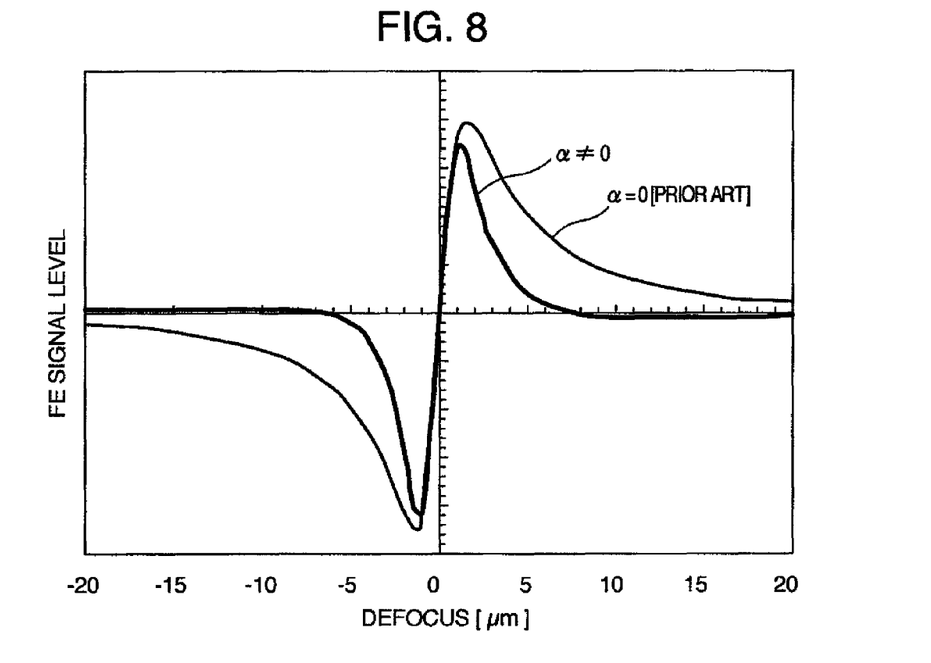
FIG. 8 is an example of waveforms of FE signals in single layer discs of the present invention type and of the conventional type.

FIG. 8 represents an FE signal of the present embodiment obtained through the aforementioned calculating operation and an FE signal according to the prior art, i.e., a signal S1 for their comparison. The drawing represents an example of waveforms of two types of FE signals detected in a single-layer disc of the optical pickup device represented in FIGS. 1 and 2; that is, the FE signal detected when the above coefficient $\alpha$ is 0 or according to the conventional method, and the FE signal ($\alpha \neq 0$) of the present embodiment. In the drawing, definition of the ordinate and the abscissa is exactly the same as in FIGS. 4 and 5.

As will be obvious from this drawing, the FE signal obtained according to the FE signal detection method of the present embodiment is more abruptly converged or decreased in its signal level in a zone passed through the upper and lower peak values of the FE signal as compared to the FE signal according to the conventional method. When the signal level is abruptly converged after the upper and lower peak values in this way, mutual interference between the FE signals can be remarkably reduced and the respective FE signals can be kept independent of each other, even when the FE signals appear to be highly close to each other from the plurality of recording layers as in the case of the highly-multilayered disc of FIG. 5.

Figure 9:
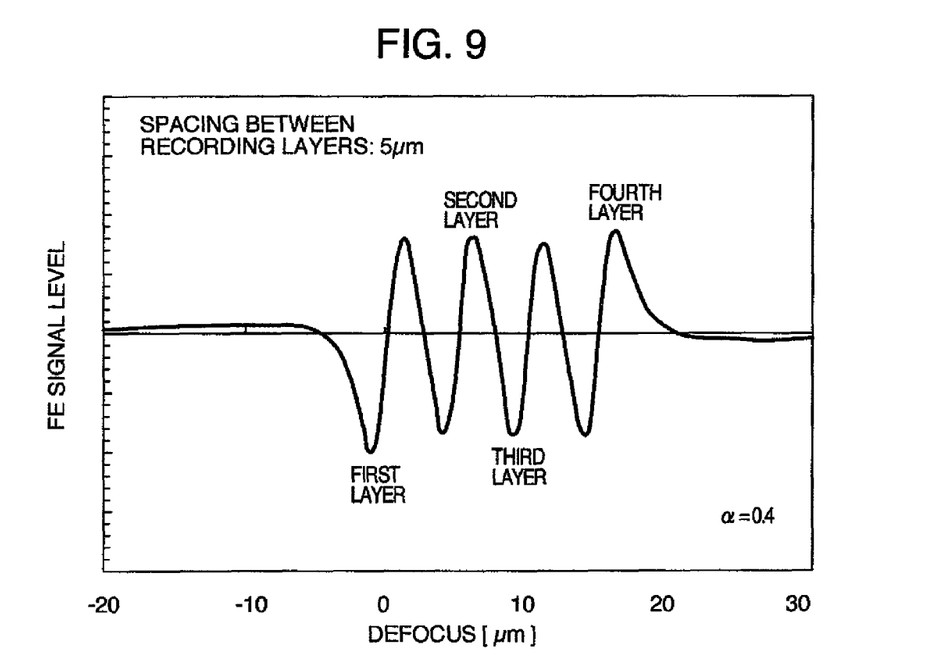
FIG. 9 is an example of a waveform of FE signals for a four-layer disc of the present invention.

FIG. 9 represents a waveform of FE signals obtained when the FE signal detection method of the present embodiment is employed for a four-layer disc having recording layers spaced by a spacing of 5 μm and when the coefficient $\alpha$ has a value of 0.4, as in the case of FIG. 5. In the drawing, definition of the ordinate and the abscissa is exactly the same as in FIGS. 5 and 8.

As will be clear from the drawing, when the FE signal detection method of the present embodiment is employed, the problem such as the undesirable offset in the FE signals, which could not be avoided in the conventional FE signal detection method, can be solved and the FE signal of any of the recording layers can be well detected.

Figure 10:
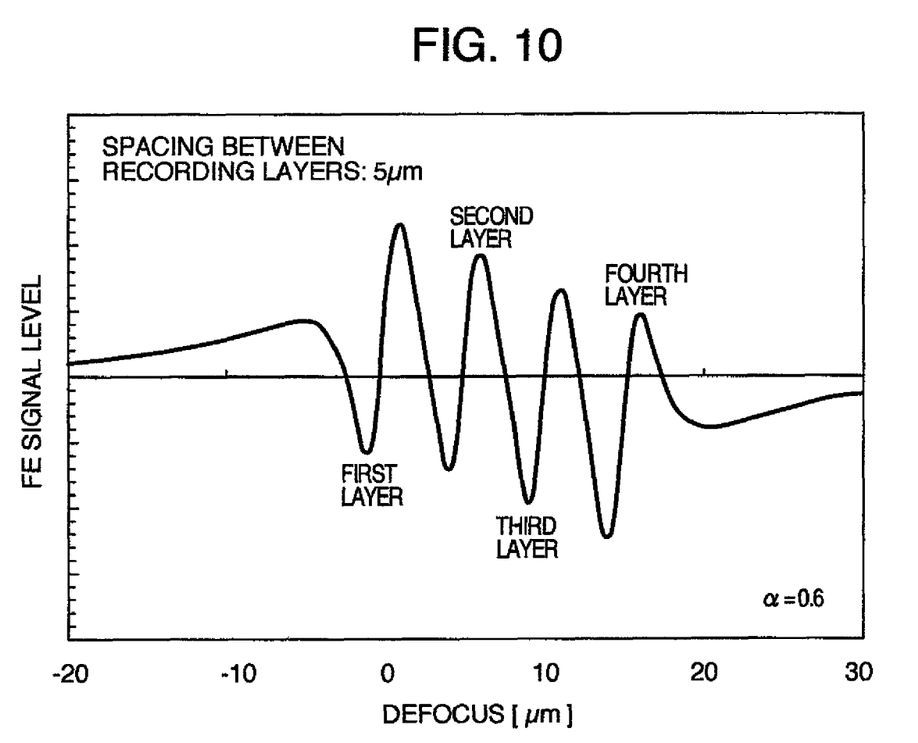
FIG. 10 is an example of a waveform of FE signals for the four-layer disc of the present invention.

Note in this connection that the coefficient value $\alpha$ cannot always be set at an arbitrary value other than zero. FIG. 10 represents a waveform of FE signals obtained when the FE signal detection method of the present invention is employed for the four-layer disc having recording layers spaced by a spacing 5 μm as in the case of FIG. 9, while the coefficient value $\alpha$ is set at 0.6. As is be clear from the drawing, when the coefficient value is 0.6, undesired offsets take place in the FE signals unlike the case of 0.4.

In other words, an optimum coefficient value $\alpha$ for each of multilayer discs is present. It has been found from our examination and study that the optimum coefficient value is determined by the size of spacing between the recording layers. Accordingly, in an actual optical pickup device, desirably, the value of a multiplication coefficient $\alpha$ in the amplifier/attenuator 43 is made to be variable as illustrated in FIG. 2 so that a coefficient adjuster 50 can adjust the coefficient at an optimum value according as the spacing between the recording layers of a multilayer disc being a recording/reproducing target.

In a highly-multilayered disc currently being put to practical use, the spacing between recording layers is designed to have a small value in a range of between approximately 3 and 10 μm. As a result of examination and study based on computer simulation, it has become obvious that, when the interlayer spacing is set to be within the above range, setting of the coefficient value $\alpha$ at a value in a range of between 0.3 and 0.5 and desirably at a value of approximately 0.4 enables acquisition of an optimum offset removal characteristics.

With respect to the FE signals newly obtained in this manner according to the present invention, mutual interference between the FE signals detected for the respective recording layers of the optical disc 8 can be reduced by optimizing the coefficient $\alpha$ according as the spacing between the recording layers. As a result, high quality FE signals can be obtained, an undesirable offset component or the like resulting from the mutual interference being well removed.

In order to record or reproduce a signal under the optimum focus control for the highly-multilayered optical disc, it is required to previously obtain an optimum value of the coefficient $\alpha$ for the target disc. In general situations, however, the optimum value of the coefficient $\alpha$ can be obtained only after the disc discrimination and the calculation of spacing between recording layers. Such operational problem can be solved through operations which will be explained below.

More in detail, the coefficient value $\alpha$ is first set at a value within a range, e.g., between 0.3 and 0.5 and desirably at a value of approximately 0.4 to remove offsets in the FE signals to such an extent as to be able to perform the disc discrimination or the interlayer spacing calculation without involving any trouble, and under this condition the disc discrimination or the interlayer spacing calculation is carried out. Based on various sorts of information obtained through the above operations, the true optimum value of the coefficient $\alpha$ is determined and set again.

The above explanation has been made on the assumption that all spacings between recording layers in a single multilayer disc are the same and have a constant value. However, there may actually exist such a multilayer disc in which spacings between adjacent recording layers are designed to be different. In such a case, accurate and reliable focus control can be executed by first setting the value of the coefficient $\alpha$ at a proper value, performing disc discrimination, interlayer spacing calculation, and so on, calculating an true optimum value of the coefficient $\alpha$ for each target recording layer, and resetting it on the basis of the obtained information, as mentioned above.

In the embodiment represented in FIGS. 1 and 2, only the arrangement of the optical system and the arrangement of the optical detector are depicted in order to detect the FE signals. This is only due to the fact that all detecting parts signals other than the FE signals are omitted because the present invention is directed to the detection of the FE signals. As a matter of course, optical systems, optical detectors, and so on, for detecting not only the FE signals but also a tracking error signal for use in tracking control, information signals recorded in a disc, and so on, are built in an actual optical pickup device.

The present invention is not restricted to the optical pickup device having such an optical system arrangement and an optical detector arrangement as represented in FIGS. 1 and 2, but also the optical pickup device may have any arrangement, so long as the pickup device is employing the FE signal detection method generally called the double knife edge or the Foucault method.

In the embodiment represented in FIG. 2, the beam receiving surfaces 31a to 31d have a simple rectangular shape. However, the present invention is not restricted to the detection surface having such a shape but the beam receiving surface may have any shape and size.

Further, the present invention is not restricted to the FE signal detection method called the double knife edge or the Foucault method represented in FIGS. 1 and 2, but may be applied even to another FE signal detection method, which will be explained below.

Embodiment 2

Figure 11:
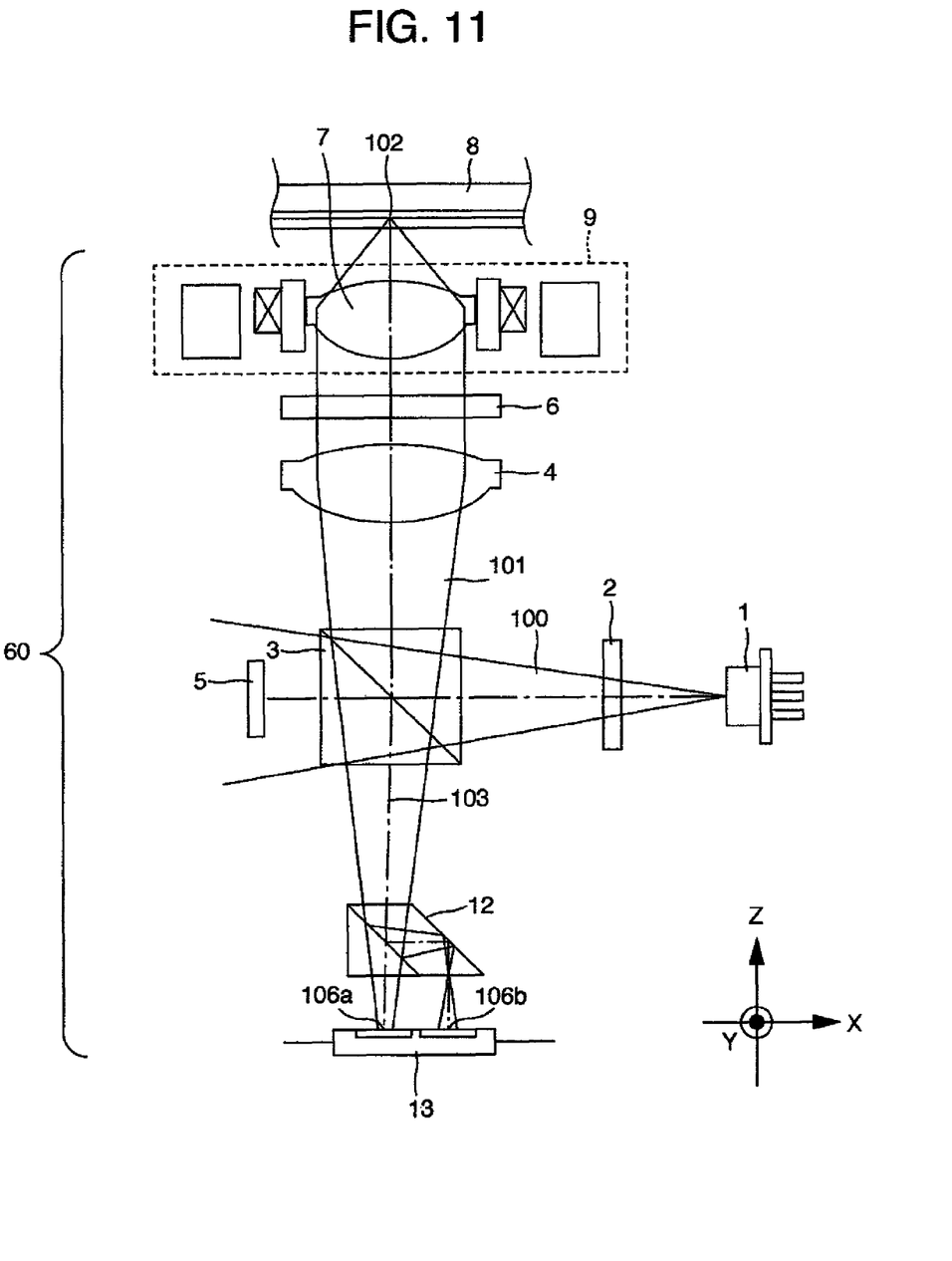
FIG. 11 is a schematic front view of an optical pickup device in accordance with a second embodiment of the present invention.
Figure 12:
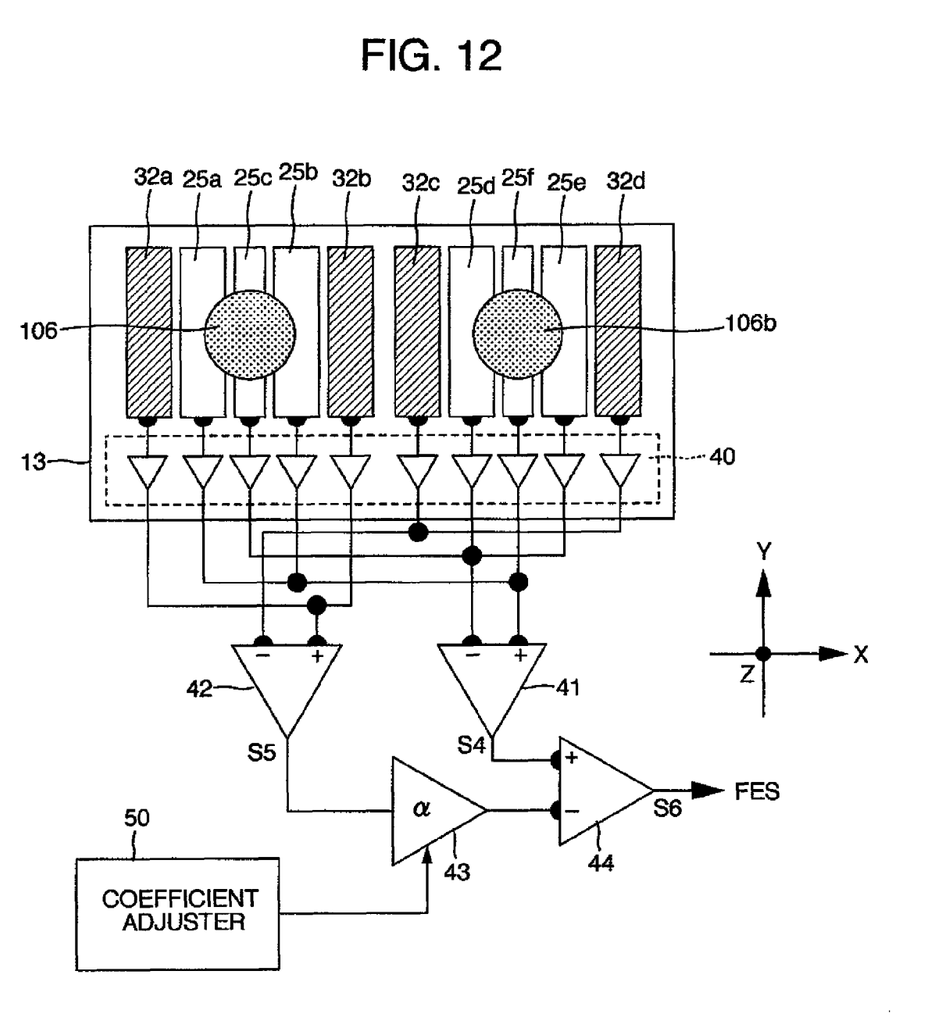
FIG. 12 is a schematic plan view of an optical detector as a major part of the second embodiment of the present invention.

FIGS. 11 and 12 represent an optical pickup device according to a second embodiment of the present invention. FIG. 11 schematically represents a front view of an arrangement of an example of an optical system in an optical pickup device 60 employing a detection method generally called a spot size detection method as a method of detecting the FE signals. FIG. 12 schematically represents an example of an optical detector 13 and a signal calculating circuit mounted on the optical pickup device 60 of FIG. 11.

In this connection, among the optical components represented in FIG. 11, the same components or those having exactly the same functions as the optical components explained in the embodiment of FIG. 1 are denoted by the same reference numerals or symbols, and detailed explanation thereof is omitted.

In the present embodiment, a light beam 103 reflected by an optical disc 8 is directed into a trapezoidal prism 12 having a half mirror surface formed therein and separated into a light beam passed through the half mirror surface and a light beam reflected by the half mirror surface. The separated light beams are irradiated on the optical detector 13 at predetermined positions to form light spots 106a and 106b, respectively. At this time, a predetermined difference in optical path lengths between proceeding optical paths within the trapezoidal prism 12 is provided between the light spots 106a and 106b.

Brief explanation will be made next as to the arrangement of beam receiving surfaces in the optical detector 13 and the arrangement of a signal calculating circuit. As represented in FIG. 12, the optical detector 13 has totally ten beam receiving surfaces 25a to 25f and 32a to 32d.

The beam receiving surfaces 25a and 25b are located at both right and left sides of the beam receiving surface 25c in parallel, and these three beam receiving surfaces 25a to 25c form a first beam receiving area. The beam receiving surfaces 25d and 25e are located at both right and left sides of the beam receiving surface 25f in parallel, and these three beam receiving surfaces 25d to 25f form a second beam receiving area. A predetermined size of light spots 106a and 106b are irradiated on the centers of the first and second beam receiving areas, respectively.

Photoelectric conversion signals output from the beam receiving surfaces 25a to 25f are sent to the current/voltage converter 40 and the subtractor 41, and output from the subtractor 41 as a signal S4. Assuming that V1a, V1b, V1c, V1d, V1e, V1f denote detection signals obtained from the beam receiving surfaces 25a to 25f through the current/voltage converter 40, respectively, then the output signal S4 is expressed by an equation (4) which follows.

$$S4=(V1a+V1b+V1f)-(V1c+V1d+V1e) \quad (4)$$

That is, the signal S4 is the same as the FE signal detected according to the conventional known detection method generally called the spot size detection method. The FE signal detection method based on the spot size detection method is already known and detailed explanation thereof is omitted.

Even in the present embodiment, similarly to the above first embodiment, beam receiving surfaces 32a to 32d are arranged at positions adjacent to the beam receiving surfaces 25a, 25b, 25c and 25d in parallel. The beam receiving surfaces 32a to 32d are newly provided in the optical pickup device of the present invention.

Photoelectric conversion signals detected from the newly-added beam receiving surfaces 32a to 32d are sent to the current/voltage converter 40 and the subtractor 42 to be subjected to predetermined calculating operation, and output from the subtractor 42 as a signal S5. Assuming that V2a, V2b, V2c and V2d denote detection signals obtained from the beam receiving surfaces 31a to 31d through the current/voltage converter 40, respectively, then the output signal S5 is expressed by an equation (5) which follows.

$$S5=(V2a+V2b)-(V2c+V2d) \quad (5)$$

Next, the signal S5 thus detected is multiplied by a predetermined coefficient value α through the amplifier/attenuator 43, and sent to the subtractor 44 to be subjected to subtracting operation to generate a signal S6 therefrom.

The signal S6 is expressed by an equation (6) which follows.

$$S6=S4-\alpha \times S5 \quad (6)$$

The signal S6 thus obtained is used as an FE signal.

In this way, even in the present embodiment when the calculating operation is carried out using an optimum coefficient value α according to the spacing between the recording layers of the optical disc 8, mutual interference between the FE signals detected for the recording layers can be desirably solved, undesired offset and so on caused by the mutual interference can be removed in exactly the same manner, which results in that high quality FE signals can be obtained.

Even in the present embodiment, only the arrangement of the optical system and the arrangement of the optical detector for detecting FE signals are illustrated in FIGS. 11 and 12. This is because, as in the first embodiment, all parts of detecting signals other than the FE signals are omitted since the present invention is directed to detection of FE signals. In an actual optical pickup device, as a matter of course, optical systems, optical detectors, and the like for detecting not only the FE signals but also a tracking error signal for tracking control and information signals recorded in the disc are also built in the pickup device.

The present invention is not restricted to the optical pickup device having such arrangements of the optical system and the optical detector as represented in FIGS. 11 and 12, but the optical pickup device may have any arrangement, so long as the pickup device is employing the FE signal detection method generally called the spot size detection method.

Although the beam receiving surfaces 32a to 32d have each a simple rectangular shape in the embodiment represented in FIG. 12, the present invention is not restricted to such a detection surface shape but the beam receiving surfaces may have any shape and size.

Embodiment 3

Figure 13:
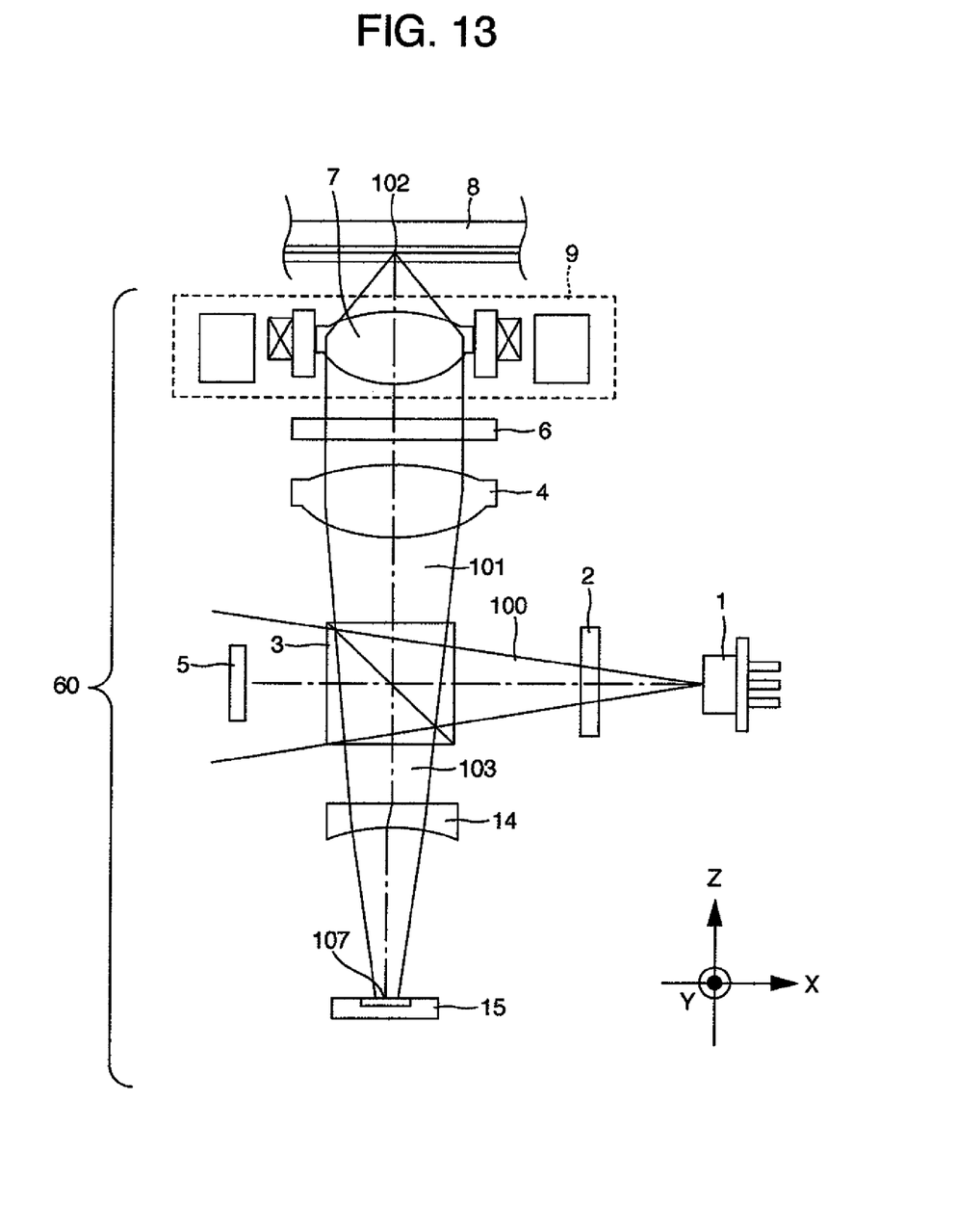
FIG. 13 is a schematic front view of an optical pickup device in accordance with a third embodiment of the present invention.
Figure 14:
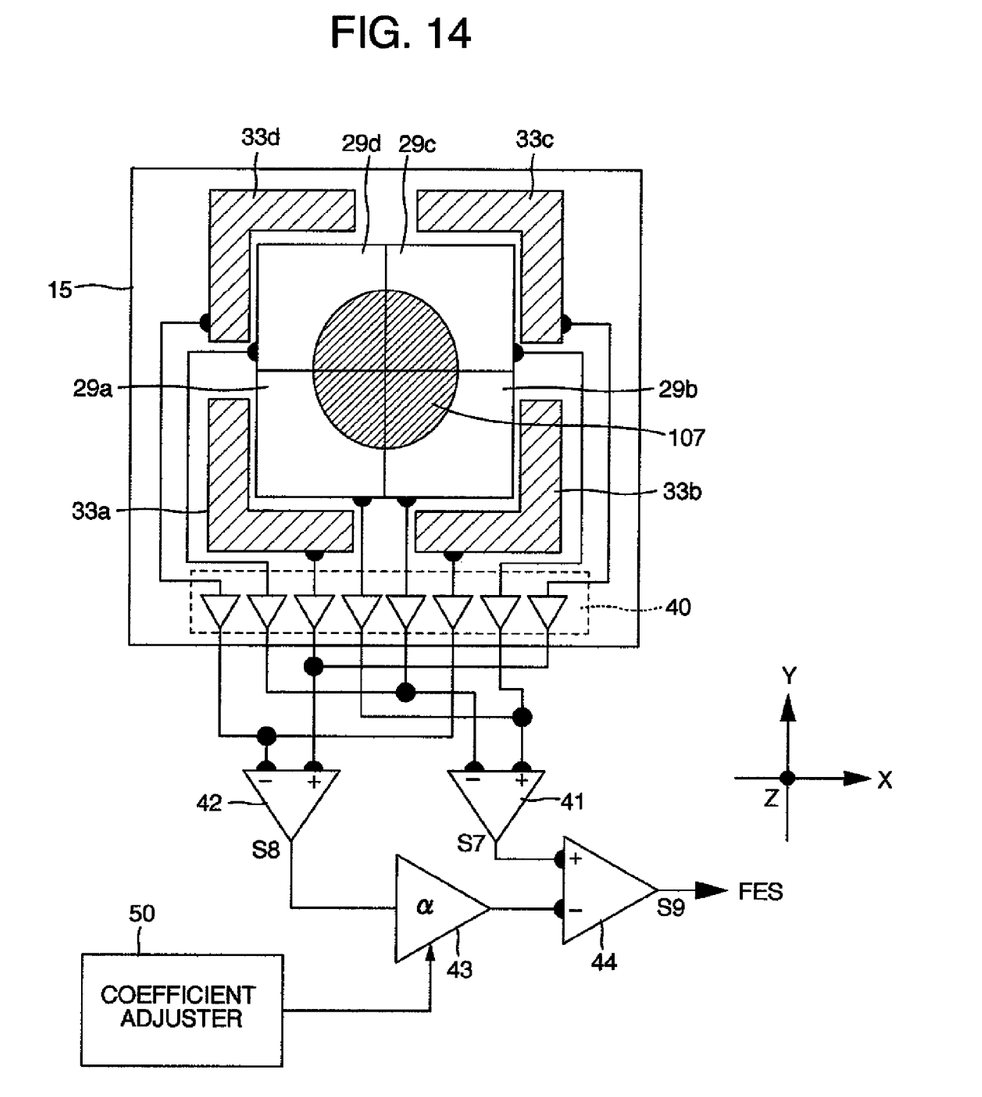
FIG. 14 is a schematic plan view of an optical detector as a major part of the third embodiment of the present invention.

FIGS. 13 and 14 represent an optical pickup device in accordance with a third embodiment of the present invention. FIG. 13 schematically represents a front view of an example of an arrangement of an optical system in an optical pickup device 60 employing a detection method generally called an astigmatic method as a method of detecting FE signals. FIG. 14 schematically represents an example of an optical detector 15 and a signal calculating circuit mounted on the optical pickup device 60 of FIG. 13.

Among the optical components represented in FIG. 13, the same components or those having the same functions as those explained in the embodiment of FIGS. 1 and 11 are denoted by the same reference numeral or symbols, and detailed explanation thereof is omitted.

In the present embodiment, a light beam 103 reflected in a multilayer optical disc is directed into a detection lens 14 to add a predetermined astigmatism to the incident light beam having a tilted main axis directed at an approximately 45 degrees with respect to the X and Y axes in the drawing, and then irradiated onto the optical detector 15 at a predetermined position to form a focused light spot 107.

Brief explanation will then be made as to an arrangement of beam receiving surfaces in the optical detector 15 and an arrangement of the signal calculating circuit. The optical detector 15 has totally eight beam receiving surfaces 29a to 29d and 33a to 33d on a same plane, as illustrated in FIG. 14.

The four beam receiving surfaces 29a to 29d are arranged to be adjacent in their vertical and horizontal directions as illustrated. A focused light spot 107 having a predetermined size is irradiated on the center of a detection area including the four beam receiving surfaces.

Photoelectric conversion signals output from the respective beam receiving surfaces 29a to 29d are sent to the current/voltage converter 40 and the subtractor 41, and then output from the subtractor 41 as a signal S7. Assuming that detection signals obtained from the respective beam receiving surfaces 29a to 29d through the current/voltage converter 40 are denoted by V1a, V1b, V2c, and V1d, respectively, then the output signal S7 is expressed by an equation (7) which follows.

$$S7=(V1a+V1c)-(V1b+V1d) \quad (7)$$

That is, the signal S7 is the same as an FE signal detected according to the conventional known detection method generally called the astigmatic method. Since how to detect the FE signal according to the astigmatic method is already known, detailed explanation thereof is omitted.

Even in the present embodiment, as in the foregoing first and second embodiments, the beam receiving surfaces 33a to 33d are arranged at positions on the same plane on which the beam receiving surfaces 29a to 29d are located and adjacent to the beam receiving surfaces 29a, 29b, 29c and 29d, respectively. The beam receiving surfaces 33a to 33d are newly added in the present embodiment.

Photoelectric conversion signals detected from the newly-added beam receiving surfaces 33a to 33d are sent to the current/voltage converter 40 and the subtractor 42 to be subjected to predetermined calculating operation, and then output from the subtractor 42 as a signal S8. Assuming that detection signals obtained from the respective beam receiving surfaces 33a to 33d through the current/voltage converter 40 are denoted by V2a, V2b, V2c and V2d, then the output signal S8 is expressed by an equation (8) which follows.

$$S8 = (V2a + V2c) - (V2b + V2d) \quad (8)$$

Next, the thus-detected signal S8 is multiplied by a predetermined coefficient value α by the amplifier/attenuator 43, and then sent to the subtractor 44 to be subjected to subtracting operation, thus generating a signal S9 from the subtractor 44. That is, the signal S9 is expressed as follows.

$$S9 = S7 - \alpha \times S8 \quad (9)$$

The signal S9 thus obtained is newly used as an FE signal (FES).

Even in the present invention, when calculating operation is carried out using an optimum coefficient value α according as the spacing between recording layers of a multilayer optical disc in this way, mutual interference between the FE signals detected for the recording layers can be desirably solved, and an undesired offset and the like caused by the mutual interference can be removed, and resultingly, high quality FE signals can be obtained as in the same way as the foregoing first and second embodiments.

Even in the present embodiment, only an arrangement of the optical system and an arrangement of the optical detector for detecting FE signals are illustrated in FIGS. 13 and 14. This is because, as in the first and second embodiments, parts of detecting signals other than the FE signals are all omitted since the present invention is directed to the detection of the FE signals. As a matter of course, optical systems, detectors, and the like for detecting not only the FE signals but also a tracking error signal for tracking control and information signals recorded in the disc are also built in an actual optical pickup device.

The present invention is not restricted to such an optical pickup device having the arrangements of the optical system and the optical detector as represented in FIGS. 13 and 14, but may be applied to any optical pickup device, so long as the optical pickup device is employing the FE signal detection method generally called the astigmatic method.

Although the beam receiving surfaces 33a to 33d have a crooked shape like L character in the embodiment of FIG. 14, the present invention is not restricted to such a shape but the beam receiving surfaces may have any shape or size including a simple rectangular or arc shape.

While we have shown and described several embodiment in accordance with our invention, it should be understood that disclosed embodiments are susceptible of changes and modifications without departing from the scope of the invention. Therefore, we do not intend to be bound by the details shown and described herein but intend to cover all such changes and modifications as to fall within the ambit of the appended claims.

The invention claimed is:

1. An optical pickup device providing a function of reproducing an information signal from a multilayer optical disc having a plurality of information-signal recording layers spaced by a predetermined spacing from each other, comprising:

a first light detection section including a plurality of beam receiving surfaces to detect a focus error signal;

a second light detection section including at least two beam receiving surfaces located at positions on a same plane on which said first light detection section is located and adjacent to said first light detection section; and means which subjects detection signals obtained from said beam receiving surfaces of said second light detection section to predetermined calculating operation to obtain a signal, amplifies or attenuates the calculated signal by multiplying the calculated signal by a predetermined coefficient value, and then subtracts the amplified or attenuated signal from said focus error signal detected from said first light detection section;

wherein said coefficient value, by which said detection signal obtained from said second light detection section is amplified or attenuated, is set at different values according as said spacing between said information-signal recording layers laminated within said multilayer optical disc.

2. An optical pickup device according to claim 1, wherein said coefficient value, by which said detection signal obtained from said second light detection section is amplified or attenuated, is set at a value within a range of between 0.3 and 0.5.

3. An optical pickup device according to claim 1, wherein said beam receiving surfaces of said first light detection section are located so as to detect said focus error signal by a double knife edge method or Foucault method.

4. An optical pickup device according to claim 1, wherein said beam receiving surfaces of said first light detection section are located so as to detect said focus error signal by a spot size detection method.

5. An optical pickup device according to claim 1, wherein said beam receiving surfaces of said first light detection section are located so as to detect said focus error signal by an astigmatic method.

6. An optical pickup device capable of reproducing or recording an information signal from or to a multilayer optical disc having a plurality of recording layers laminated being spaced by a predetermined spacing from each other, comprising:

a first light detection section having a plurality of beam receiving surfaces to detect a focus error signal;

a second light detection section having at least two beam receiving surfaces located on a same plane on which said first light detection section is located so as to sandwich said plurality of beam receiving surfaces of said first light detection section;

wherein detection signals obtained from said respective beam receiving surfaces of said second light detection section are subjected to predetermined calculating operation to obtain a signal, amplified or attenuated by multiplying the calculated signal by a predetermined coefficient value to obtain a amplified or attenuated signal, and then the amplified or attenuated signal is subtracted from said focus error signal detected by said first light detection section;

a coefficient adjuster which changes said predetermined coefficient value;

wherein said coefficient adjuster can set said coefficient value at a value according as a spacing between the respective recording layers laminated within the multilayer optical disc.

\* \* \* \* \*